United States Patent Office 3,360,557
Patented Dec. 26, 1967

3,360,557
9-HYDROXYTETRACYCLINES AND A PROCESS OF PREPARING SAME
Ping Shu, Pearl River, N.Y., assignor to American Cyanamid Company, New York, N.Y., a corporation of Maine
No Drawing. Filed May 10, 1963, Ser. No. 279,632
11 Claims. (Cl. 260—559)

This invention relates to new organic compounds and, more particularly, is concerned with novel 9-hydroxytetracyclines and to a method of preparing these novel compounds. The novel 9-hydroxytetracyclines of the present invention may be represented by the following general formula:

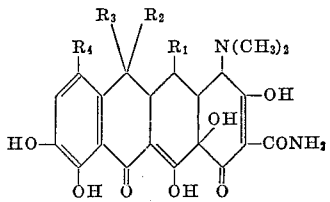

wherein $R_1$ is hydrogen or hydroxy, $R_2$ is hydrogen or hydroxy, $R_3$ is hydrogen or methyl, $R_2$ and $R_3$ taken together is methylene, and $R_4$ is hydrogen, halogen, nitro, amino, mono(lower alkyl)amino or di(lower alkyl) amino. Suitable lower alkyl groups contemplated by the present invention are those having up to about 6 carbon atoms. Halogen is exemplified by chlorine and bromine. Typical compounds represented by the above general formula are, for example, 9-hydroxytetracycline, 9-hydroxy-7-chlorotetracycline, 9-hydroxy-6-demethyltetracycline, 9-hydroxy-7-chloro - 6 - demethyltetracycline, 9-hydroxy-6-deoxytetracycline, 9-hydroxy - 7 - chloro - 6 - deoxytetracycline, 9-hydroxy-6-demethyl - 6 - deoxytetracycline, 9-hydroxy-7-chloro - 6 - demethyl-6-deoxytetracycline, 5,9-dihydroxytetracycline, 9-hydroxy - 7 - nitrotetracycline, 9-hydroxy - 7 - aminotetracycline, 9-hydroxy-7-nitro-6-demethyltetracycline, 9-hydroxy - 7 - amino-6-demethyltetracycline, 9-hydroxy - 7 - methylamino-6-demethyl-6-deoxytetracyline, and 9-hydroxy-6-demethyl-6-deoxy-6-methylenetetracycline.

The novel 9-hydroxytetracyclines of the present invention general, white crystalline solids, the free bases of which are soluble in organic solvents such as alcohols, chloroform, dimethylformamide, dioxane, pyridine, and the like; and the salts of which are soluble in polar solvents such as water and lower alkanols.

The present invention also embraces the useful non-toxic pharmaceutically acceptable metal-enolate and acid-addition salts of these novel compounds. Typical metal-enolate salts are the sodium salts; and typical acid-addition salts are the hydrochlorides, hydrobromides, sulfates, citrates, tartrates, succinates, and the like.

The novel 9-hydroxytetracyclines of the present invention are biologically active and possess the broad spectrum antibacterial activity of the previously known tetracyclines. The antibacterial spectrum of a compound represents the amount required to inhibit the growth of various typical bacteria and is commonly determined in a standard manner by the agar dilution streak technique. The minimal inhibitory concentrations, expressed in gammas per milliliter, of two typical compounds of the present invention against various test organisms are shown in Table I below.

TABLE I

| Organism | ATCC No. | 9-hydroxy-7-chlorotetracycline | 9-hydroxy-7-chloro-6-demethyltetracycline | Tetracycline Hydrochloride |
|---|---|---|---|---|
| Mycobacterium ranae | 11375 | 4 | 8 | 2 |
| Mycobacterium smegmatis | 607 | 8 | 8 | 2 |
| Staphylococcus aureus | 6538 P | 4 | 8 | 4 |
| Streptococcus faecalis | 8043 | 4 | 4 | 4 |
| Bacillus subtilis | 6633 | 2 | 2 | 1 |
| Streptococcus pyogenes | 12384 | 1 | 0.5 | 1 |
| Streptococcus γNo. 11 | | >250 | >250 | >250 |
| Staphylococcus 69 | | >250 | >250 | >250 |
| Streptococcus β 80 | | >250 | >250 | >250 |
| Klebsiella pneumoniae | 10031 | 8 | 8 | 4 |
| Bacillus cereus | 10702 | 2 | 4 | 1 |
| Pseudomonas aeruginosa | 10145 | 250 | 250 | 62 |
| Proteus vulgaris | 9484 | 15 | 15 | 15 |
| Escherichia coli | 9637 | 62 | 31 | 31 |
| Salmonella gallinarum | 9184 | 62 | 31 | 15 |
| Escherichia coli No. 22 | | 15 | 8 | 4 |

In addition, the novel 9-hydroxytetracyclines of the present invention possess activity parenterally against *Staphylococcus aureus*, strain Smith, infections in mice. *Staphylococcus aureus*, strain Smith, has been studied and described by J. M. Smith and R. J. Dubos in Journ. Expt. Med., 103, 87 (1956), at the Rockefeller Institute. *Staphylococcus aureus*, strain Smith, is coagulase positive, tellurite negative and is sensitive to tetracycline, penicillin, streptomycin, erythromycin, carbomycin, neomycin, chloramphenicol and novobiocin in vitro. Attempts have been made for phage typing of this strain, but it has been determined that it is non-typable.

The novel 9-hydroxytetracyclines of the present invention may be readily prepared by the 9-hydroxylation of a compound of the following general formula:

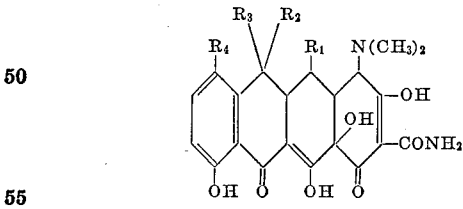

wherein $R_1$, $R_2$, $R_3$ and $R_4$ are as hereinabove defined. This 9-hydroxylation may be readily accomplished in aqueous media by treating the 9-unsubstituted-tetracycline with an oxidizing agent in the presence of ascorbic acid, a chelating agent, and a metallic ion source. Suitable chelating agents may be, for example, ethylene-diaminetetraäcetic acid or its salts, diethylene-triaminepentaäcetic acid or its salts, cyclohexanediaminetetraäcetic acid or its salts, nitrilotriacetic acid, etc. The metallic ion source may be any electron transport system which contains metallic ions such as iron, copper, cobalt, manganese, and the like. The metallic ion source may most conveniently be the salts of the metallic ions such as ferric chloride, ferrous sulfate, cupric chloride, cuprous cyanide, cobaltic acetate, cobaltous chloride, manganic orthophosphate, manganous carbonate, etc.

Among the suitable oxidizing agents that may be employed in carrying out the described 9-hydroxylation are oxygen-containing gases and peroxides such as hydrogen peroxide and sodium peroxide. The invention is not limited to the oxidizing agents listed above but other oxidizing agents having standard oxidizing potentials at 25° C. within the range of from +0.1 volt to +2.0 volts may also be used if desired. The concentration of the oxidizing agent that is necessary to effect the desired 9-hydroxylation may be varied over a fairly wide range. In general, it has been found that the oxidizing agent may be present in the reaction mixture in amounts ranging from about one-eighth to about twice the molar concentration of the 9-unsubstituted-tetracycline.

The other conditions for the 9-hydroxylation are not particularly critical. The reaction may be carried out within a temperature range of from about −5° C. to about 100° C., although a temperature range of from 20° C. to 30° C. is preferred. The pH of the solution, although not critical, is usually adjusted to between 2.0 and 9.0. The reaction time is directly dependent upon the strength of the oxidizing agent and may be from 5 minutes to 72 hours. It is at times desirable to utilize a water-miscible organic solvent, particularly when the tetracycline starting material is of limited solubility in the reaction mixture. The water-miscible solvent does not alter the course of the 9-hydroxylation, but merely provides for more efficient 9-hydroxylation, e.g. a shorter reaction time by providing more intimate contact with the reagents. A large number of such solvents are available for this purpose and include, among others, dimethylformamide, dimethoxyethane, methanol, ethanol, dioxane, tetrahydrofuran, and the like.

Specific starting materials operable in the 9-hydroxylation process of the present invention include tetracycline, 7-chlorotetracycline, 6-demethyltetracycline, 7-chloro-6-demethyltetracycline, 6-deoxytetracycline, 7-chloro-6-deoxytetracycline, 6-demethyl - 6 - deoxytetracycline, 7-chloro - 6 - demethyl - 6 - deoxytetracycline, 5-hydroxytetracycline, 7-nitrotetracycline, 7-aminotetracycline, 7-nitro-6-demethyltetracycline, 7-amino - 6 - demethyltetracycline, 7-methylamino - 6 - demethyl-6-deoxytetracycline and 6-demethyl - 6 - deoxy-6-methylenetetracycline. The tetracycline starting materials may be employed in the novel process of the present invention either in the form of their free bases or in the form of their salts with various organic and inorganic acids.

The 9-hydroxytetracyclines are obtained from the reaction mixtures by standard procedures. For example, the products may be isolated by precipitation with a solvent, such as ether or hexane, or by concentration, usually under reduced pressure, or by a combination of these. Work-up of the reaction mixtures to obtain the desired products may also be acomplished by known procedures such as precipitation, concentration, solvent extraction, or combinations of these procedures. After isolation, the products may be purified by any of the generally known methods for purification of tetracycline compounds. These include recrystallization from various solvents and mixed solvents systems, chromatographic techniques, and counter current distribution, all of which are usually employed for this purpose.

The invention will be described in greater detail in conjunction with the following specific examples.

*Example 1.—Preparation of 9-hydroxy-7-chloro-6-demethyltetracycline*

One hundred grams of 7-chloro-6-demethyltetracycline were dissolved in 20 liters of an aqueous solution containing 200 grams of ascorbic acid, 182 grams of the sodium salt of ethylenediaminetetraacetic acid and 28.8 grams of ferrous sulfate heptahydrate ($FeSO_4 \cdot 7H_2O$). The pH of the solution was adjusted to 3 with concentrated phosphoric acid. Four hundred milliliters of 30% hydrogen peroxide was added slowly to the solution with agitation. This mixture was kept at room temperature (23°–25° C.) for 45 minutes and then freeze-dried for purification. Paper chromatographic examination with an n-butanol-phosphate buffer (pH 3.0) system indicated the formation of a biologically active 9-hydroxy derivative with an $Rf$ value lower than 7-chloro-6-demethyltetracycline. The ratio of the $Rf$ value of 9-hydroxy-7-chloro-6-demethyltetracycline to that of 7-chloro-6-demethyltetracycline is approximately 0.6. A 60 gram portion of the product-containing reaction mixture was purified through conventional celite chromatographic columns and crystallized as the monohydrate. The product was purified by recrystallization. The yield was 0.31 gram.

*Example 2.—Preparation of 9-hydroxy-7-chlorotetracycline*

Fifty grams of 7-chlorotetracycline hydrochloride were dissolved in 10 liters of an aqueous solution containing 100 grams of ascorbic acid, 96 grams of the sodium salt of ethylenediaminetetraäcetic acid and 14.4 grams of ferrous sulfate heptahydrate. The pH of the solution was adjusted to 2.9–3.0. To this solution, 200 ml. of 30% hydrogen peroxide was added slowly with agitation. The solution was allowed to stand at room temperature for 45 minutes. The mixture was then freeze-dried. The freeze-dried material was shown to contain biologically active 9-hydroxy-7-chlorotetracycline when examined in an n-butanol-phosphate (pH 3) paper chromatographic system. The 9-hydroxylated derivative gave a lower $Rf$ value than 7-chlorotetracycline. A 20 gram portion of the dried material was purified by conventional celite chromatographic columns and crystallized as the monohydrate. The yield was 0.15 gm.

*Example 3.—Preparation of 9-hydroxy-6-demethyltetracycline*

A portion of 6-demethyltetracycline was dissolved in an aqueous solution of ascorbic acid, the sodium salt of ethylenediaminetetraäcetic acid and ferrous sulfate heptahydrate. The pH of this solution was adjusted to 3.0. To this solution 30% hydrogen peroxide was added slowly with agitation. This solution was allowed to stand at room temperature for 45 minutes. The mixture was freeze-dried and shown to contain biologically active 9-hydroxy-6-demethyltetracycline when examined with an n-butanol phosphate (pH 3) paper chromatography system. The hydroxylated derivative has a lower $Rf$ value than the parent 6-demethyltetracycline.

*Example 4.—Preparation of 9-hydroxy-6-demethyltetracycline*

One hundred and fifty milligrams of 9-hydroxy-7-chloro-6-demethyltetracycline monohydrate, prepared as described in Example 1, were mixed with 28 milligrams of palladium on alumina (5%) catalyst and hydrogenated in a 10% aqueous triethylamine solution at 20–25 lbs. per square inch pressure for 3 hours. The mixture was acidified with carbon dioxide, diluted with water and centrifuged to remove the catalyst. The clear solution was dried and the product was purified through conventional celite chromatographic columns and the 9-hydroxy-6-demethyltetracycline was crystallized as the monohydrate.

*Example 5.—Preparation of 9-hydroxytetracycline*

A portion of tetracycline hydrochloride was dissolved in an aqueous solution of ascorbic acid, the sodium salt of ethylenediaminetetraäcetic acid and ferrous sulfate heptahydrate. The pH of the solution was adjusted to 3.0. To this solution, 30% hydrogen peroxide was added slowly with agitation. The solution was allowed to stand at room temperature for 45 minutes. The mixture was freeze-dried and shown to contain biologically active 9-hydroxytetracycline when examined in an n-butanol-phosphate (pH 3) chromatographic system. The 9-hydroxylated derivative has a lower $Rf$ value than tetracycline.

*Example 6.—Preparation of 9-hydroxy-7-nitro-6-demethyl-6-deoxytetracycline*

A portion of 7-nitro-6-demethyl-6-deoxytetracycline was dissolved in an aqueous solution of ascorbic acid, the sodium salt of ethylenediaminetetraäcetic acid and ferrous sulfate heptahydrate. The pH of this solution was adjusted to 3.0 with a mineral acid. Hydrogen peroxide (30%) was added slowly to this solution with agitation. The mixture was kept at room temperature for 45 minutes and then freeze-dried for purification. Paper chromatographic examination with an n-butanol-phosphate (pH 3) system indicated the formation of the 9-hydroxy derivative.

*Example 7.—Preparation of 9-hydroxy-6-demethyl-6-deoxytetracycline*

A portion of 6-demethyl-6-deoxytetracycline was dissolved in an aqueous solution or ascorbic acid, a salt of ethylenediaminetetraäcetic acid and ferrous sulfate heptahydrate. The pH of the solution was adjusted to 3.0 with a mineral acid. Hydrogen peroxide (30%) was added slowly to the solution with agitation. The mixture was kept at room temperature for 45 minutes and then freeze-dried for purification. Paper chromatographic examination with an n-butanol-phosphate buffer (pH 3) system indicated the formation of the 9-hydroxy-derivative.

What is claimed is:

1. A compound selected from the group consisting of compounds of the formula:

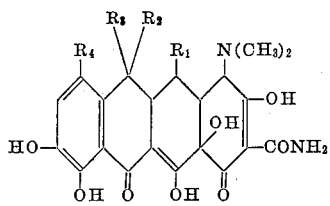

wherein $R_1$ is selected from the group consisting of hydrogen and hydroxy, $R_2$ is selected from the group consisting of hydrogen and hydroxy, $R_3$ is selected from the group consisting of hydrogen and methyl, $R_4$ is selected from the group consisting of hydrogen, halogen, nitro, amino, mono(lower alkyl)amino and di(lower alkyl)amino, and $R_2$ and $R_3$ taken together is methylene; and the non-toxic pharmaceutically aceptable acid-addition and metal-enolate salts thereof.

2. 9-hydroxytetracycline.
3. 9-hydroxy-6-demethyltetracycline.
4. 9-hydroxy-7-chlorotetracycline.
5. 9-hydroxy-7-chloro-6-demethyltetracycline.
6. 9-hydroxy-7-amino-6-demethyl-6-deoxytetracycline.
7. 9-hydroxy-7-nitro-6-demethyl-6-deoxytetracycline.
8. 9-hydroxy-6-demethyl-6-deoxytetracycline.
9. 5,9-dihydroxytetracycline.
10. 9-hydroxy-7-methylamino-6-demethyl-6-deoxytetracycline.

11. The process of preparing compounds of the formula:

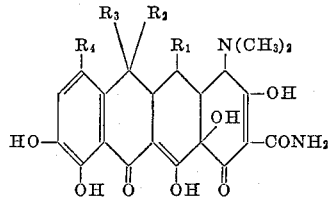

wherein $R_1$ is selected from the group consisting of hydrogen and hydroxy, $R_2$ is selected from the group consisting of hydrogen and hydroxy, $R_3$ is selected from the group consisting of hydrogen and methyl, $R_2$ and $R_3$ taken together is methylene, and $R_4$ is selected from the group consisting of hydrogen, halogen, nitro, amino, mono(lower alkyl)amino and di(lower alkyl)amino, which comprises contacting a compound of the formula:

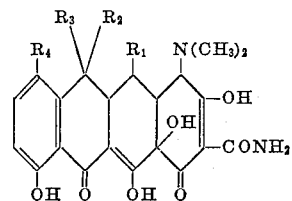

wherein $R_1$, $R_2$, $R_3$ and $R_4$ are as hereinabove defined, with an oxidizing agent selected from the group consisting of oxygen gas and peroxides; in the presence of metallic ions selected from the group consisting of iron, copper, cobalt and manganese, a chelating agent and ascorbic acid.

No references cited.

NICHOLAS S. RIZZO, *Primary Examiner.*

HENRY R. JILES, *Examiner.*

J. W. ADAMS, *Assistant Examiner.*